US011782034B2

(12) United States Patent
Tamaoki et al.

(10) Patent No.: US 11,782,034 B2
(45) Date of Patent: Oct. 10, 2023

(54) FRACTION COLLECTOR CONTROL DEVICE AND PREPARATIVE LIQUID CHROMATOGRAPH

(71) Applicant: SHIMADZU CORPORATION, Kyoto (JP)

(72) Inventors: Soichiro Tamaoki, Kyoto (JP); Tsutomu Okoba, Kyoto (JP); Takayuki Iriki, Kyoto (JP); Shiori Ueda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 882 days.

(21) Appl. No.: 16/491,282

(22) PCT Filed: Mar. 7, 2017

(86) PCT No.: PCT/JP2017/008960
§ 371 (c)(1),
(2) Date: Sep. 5, 2019

(87) PCT Pub. No.: WO2018/163276
PCT Pub. Date: Sep. 13, 2018

(65) Prior Publication Data
US 2020/0240966 A1 Jul. 30, 2020

(51) Int. Cl.
*G01N 30/82* (2006.01)
*G01N 30/86* (2006.01)
(Continued)

(52) U.S. Cl.
CPC ............ *G01N 30/82* (2013.01); *G01N 30/80* (2013.01); *G01N 30/86* (2013.01);
(Continued)

(58) Field of Classification Search
CPC ........ G01N 30/16; G01N 30/80; G01N 30/82; G01N 30/86; G01N 2030/027; G01N 30/8624; G01N 30/8627; G01N 30/8631
See application file for complete search history.

(56) References Cited

U.S. PATENT DOCUMENTS

| 5,670,054 A * | 9/1997 | Kibbey | G01N 30/82 |
| | | | 210/659 |
| 2004/0018118 A1* | 1/2004 | Waki | G01N 30/78 |
| | | | 422/70 |
| 2015/0081250 A1 | 3/2015 | Nakayama | |

FOREIGN PATENT DOCUMENTS

| CN | 104458981 A | 3/2015 |
| JP | 2002-005914 A | 1/2002 |

(Continued)

OTHER PUBLICATIONS

Office Action for corresponding Taiwan Patent Application No. 107107398 dated Sep. 11, 2019, with English language translation.
(Continued)

*Primary Examiner* — Paul M. West
(74) *Attorney, Agent, or Firm* — Renner, Otto, Boisselle & Sklar, LLP (57) ABSTRACT

A fraction collector control device includes a peak designation part that displays a chromatogram for setting and requires a user to select at least one peak in the chromatogram for setting, a parameter extraction part that extracts, as a parameter, a signal level and/or a slope at a start point and an end point of each peak designated by a user, and a threshold candidate generation part that generates, based on the parameter extracted by the parameter extraction part, a threshold candidate usable as a common threshold for detecting start points of all peaks designated by a user and a common threshold for detecting end points of all peaks designated by a user.

9 Claims, 4 Drawing Sheets

(51) Int. Cl.
G01N 30/80 (2006.01)
G01N 30/16 (2006.01)
G01N 30/02 (2006.01)
G01N 30/06 (2006.01)

(52) U.S. Cl.
CPC ..... *G01N 30/8624* (2013.01); *G01N 30/8627* (2013.01); *G01N 30/8631* (2013.01); *G01N 30/06* (2013.01); *G01N 2030/027* (2013.01)

(56) References Cited

FOREIGN PATENT DOCUMENTS

| JP | 2008-122081 A | 5/2008 | |
|---|---|---|---|
| WO | WO-2005079263 A2 * | 9/2005 | ......... G01N 30/8675 |

OTHER PUBLICATIONS

Agilent Technologies; Agilent 1290 Infinity II Preparative Open-Bed Fraction Collector for Fraction Collection Based on Time, Peak and Mass; 2016, with English language translation.

Office Action for corresponding CN Application No. 201780087990.9 dated Apr. 16, 2021, with English language translation.

International Search Report for corresponding Application No. PCT/JP2017/008960, dated May 23, 2017.

Written Opinion for corresponding Application No. PCT/JP2017/008960, dated May 23, 2017.

"Practical Usage of Semi-preparative System", Jasco Report, pp. 21-24, vol. 54 No. 1, 2012.

Taiwan Office Action for corresponding Application No. 107107398, dated Dec. 11, 2018.

* cited by examiner

FRACTION COLLECTOR CONTROL DEVICE AND PREPARATIVE LIQUID CHROMATOGRAPH

TECHNICAL FIELD

The present invention relates to a fraction collector control device that controls operation of a fraction collector that fractionates and collects components based on a signal from a detector of a liquid chromatograph, and a preparative liquid chromatograph equipped with the fraction collector control device.

BACKGROUND ART

A preparative liquid chromatograph is known that separates and collects a plurality of components included in a sample using a liquid chromatograph as typified by a high performance liquid chromatograph. The preparative liquid chromatograph includes a chromatograph part equipped with a liquid feeding device for feeding a mobile phase, an analysis column, a detector, and the like, a fraction collector provided on a latter stage side of the chromatograph part, and a control device controlling these. The fraction collector is configured to operate based on a signal of the detector in the chromatograph part, and components temporally separated by the analysis column are fractionated and collected by the fraction collector.

In the above-described preparative liquid chromatograph, it is necessary to set in advance parameters for detecting peaks appearing in a signal of the detector. The parameters for detecting peaks are thresholds of a signal level and a slope of a signal waveform. In a case where a plurality of peaks appear in an analysis of one sample, there are a method using a common threshold to detect those peaks and a method using an individual threshold for each peak (for example, Patent Document 1).

PRIOR ART DOCUMENTS

Patent Documents

Patent Document 1: Japanese Patent Laid-open Publication No. 2002-005914

SUMMARY OF THE INVENTION

Problems to be Solved by the Invention

Conventionally, in a method of detecting a plurality of peaks appearing in a signal of a detector using a common threshold, after performing a trial analysis on a sample to be analyzed to set a threshold, it has been necessary to repeat (1) a step in which the user instinctively sets a threshold for detecting desired peaks based on a chromatogram obtained by the analysis, and (2) a step of performing a simulation as to whether or not the desired peaks are detected with the threshold instinctively set by the user, until peaks detected in the simulation of (2) matches the desired peaks. Therefore, the threshold setting operation for peak detection has become very complicated.

The present invention has been made in view of the above problem, and it is an object of the present invention to enable threshold setting operation for detecting peaks of a separation subject to be performed more promptly and simply.

Solutions to the Problems

The fraction collector control device according to the present invention controls operation of a fraction collector that fractionates and collects components separated by an analysis column of a liquid chromatograph based on a signal obtained by a detector of the liquid chromatograph. The fraction collector control device includes a peak designation part configured to display a chromatogram based on analysis data of a liquid chromatograph acquired in advance as a chromatogram for setting, and to require a user to select at least one peak in the chromatogram for setting, a parameter extraction part configured to extract, as a parameter, a signal level and/or a slope at a start point and an end point of each peak designated by the user, a threshold candidate generation part configured to generate, based on the parameter extracted by the parameter extraction part, a threshold candidate usable as a common threshold for detecting start points of all peaks designated by the user and a common threshold for detecting end points of all peaks designated by the user, and a control part configured to control the fraction collector so as to detect, and fractionate and collect components of the peaks by using a threshold determined based on the threshold candidate generated by the threshold candidate generation part.

The parameters for a threshold for detecting start points and end points of peaks are a signal level and a slope of the detector. Whether it is preferable to use, as the threshold, both a signal level and a slope, only a signal level, or only a slope may change depending on, for example, the presence or absence of drift in a baseline, a slope of the baseline, and the like. Conventionally, such a determination condition has been determined by the user by looking at a signal waveform.

On the other hand, a preferred embodiment of the fraction collector control device of the present invention further includes a determination condition selection part configured to select to use, as the threshold, which of only a signal level, only a slope, and both a signal level and a slope, based on a shape of the chromatogram for setting. In this manner, the burden on work of the user in setting a threshold is reduced.

In the fraction collector control device of the present invention, the device may automatically determine a threshold used for actual peak detection based on a threshold candidate generated by the threshold candidate generation part. On the other hand, when fractionation and collection of components are performed using a threshold automatically determined by the device, a situation where a peak range desired by the user cannot be fractionated may occur.

In view of the above, preferably, the fraction collector further includes a threshold determination part that presents the user with a threshold candidate generated by the threshold candidate generation part and requires the user to determine a threshold. Then, the user can refer to the threshold candidate generated by the threshold candidate generation part, and, based on that, the user can set an optimal threshold. The user determining a threshold includes that the user selects an appropriate one of presented threshold candidates as a threshold, as well as that the user sets a value based on the presented threshold candidates.

In a preferred embodiment, the threshold candidate generation part is configured to generate simulation parameters based on the parameter extracted by the parameter extraction part, to execute simulation of peak detection in the chromatogram for setting using the simulation parameters, and to set, as the threshold candidate, only simulation parameters used in simulation in which only peaks designated by a user are detected. In this manner, the simulation using the generated parameter candidate is automatically performed, and only the parameters in which only the peaks specified by the user are detected are set as the threshold candidate. Accordingly, the user no longer needs to execute the simulation to check whether the designated peaks are actually detected.

In a case where the simulation is executed as described above, the threshold determination part is preferably configured to present the user with the threshold candidate generated by the threshold candidate generation part, as well as a result of the simulation executed by using the threshold candidate. Then, when determining a threshold, the user can refer to a simulation result using the threshold candidate together with the threshold candidate, which makes it easy to determine the threshold.

Note that the fraction collector control device of the present invention preferably supports a liquid chromatograph equipped with a plurality of types of detectors. In that case, the threshold candidate generation part is configured to generate a threshold candidate for detecting peaks designated by the user in chromatograms obtained by a plurality of detectors. This also facilitates setting of a threshold required to detect peaks based on a signal of a plurality of detectors.

A preparative liquid chromatograph according to the present invention includes a liquid feeding device for feeding a mobile phase, an analysis channel through which a mobile phase fed by the liquid feeding device flows, a sample injection part for injecting a sample into the analysis channel, an analysis column that separates a sample into components downstream of the sample injection part on the analysis channel, a detector for detecting the components separated by the analysis column downstream of the analysis column on the analysis channel, a fraction collector for collecting components that has passed through the detector on an outlet side of the detector, and the fraction collector control device of the present invention that controls the fraction collector based on a detection signal obtained in the detector so that the components separated by the analysis column is fractionated and collected by the fraction collector.

Effects of the Invention

A fraction collector control device of the present invention is configured to extract, as a parameter, a signal level and/or a slope at a start point and an end point of each peak designated by a user on a chromatogram for setting, and generate, based on the extracted parameter, a threshold candidate usable as a common threshold for detecting start points of all peaks designated by a user and a common threshold for detecting end points of all peaks designated by the user. Accordingly, a candidate for a usable threshold is automatically generated, and instinctive adjustment of a threshold and simulation using the threshold performed by the user no longer need to be repeated. This simplifies the setting operation of the threshold.

The preparative liquid chromatograph of the present invention includes the above-mentioned fraction collector control device. Accordingly, the setting operation of a threshold for fractionating desired peaks is facilitated.

EMBODIMENTS OF THE INVENTION

Hereinafter, one embodiment of a fraction collector control device and a preparative liquid chromatograph of the present invention will be described with reference to the drawings.

Figure 1:
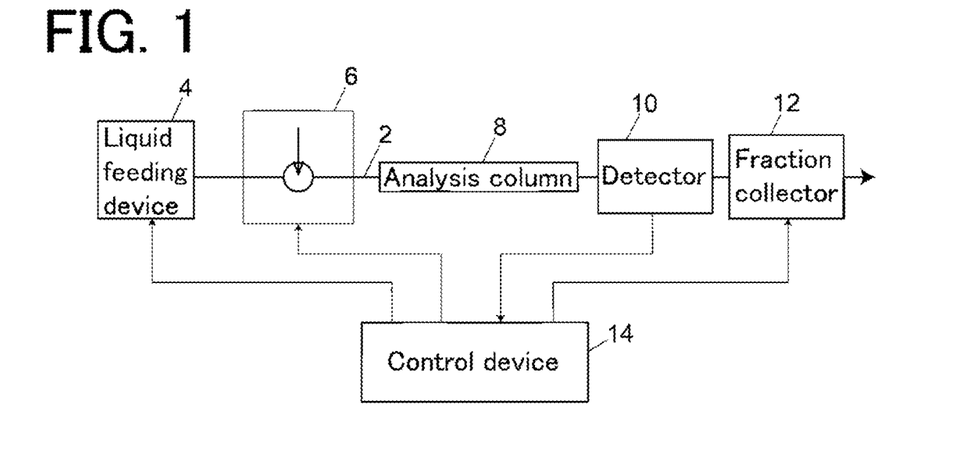
FIG. 1 is a schematic channel configuration diagram showing one embodiment of a preparative liquid chromatograph.

FIG. 1 schematically shows a configuration of the preparative liquid chromatograph.

The preparative liquid chromatograph includes a liquid feeding device 4 for feeding a mobile phase in an analysis channel 2, a sample injection part 6 for injecting a sample into the analysis channel 2, an analysis column 8 for separating a sample into components, a detector 10 for detecting the components separated by the analysis column 8, a fraction collector 12 for fractionating and collecting the components separated by the analysis column 8, and a control device 14 for performing operation control of the entire preparative liquid chromatograph.

The sample injection part 6 is provided downstream of the liquid feeding device 4 on the analysis channel 2. The sample injection part 6 is an autosampler configured to automatically collect a sample and inject the sample into the analysis channel 2 through which a mobile phase from the liquid feeding device 4 flows. An analysis column 8 is provided downstream of the sample injection part 6 on the analysis channel 2. A sample injected by the sample injection part 6 is transported to the analysis column 8 by the mobile phase from the liquid feeding device 4 and separated into components.

The detector 10 is provided downstream of the analysis column 8 on the analysis channel 2, and the components separated by the analysis column 8 appear as a peak in a detected waveform obtained by the detector 10. The fraction collector 12 is provided on a latter stage of the detector 10. Operation of the fraction collector 12 is controlled by the control device 14.

The control device 14 functions as a fraction collector control device that controls the operation of the fraction collector 12 based on a signal from the detector 10. The control device 14 is configured to perform operation control of not only the fraction collector 12, but also a column oven (not shown) for controlling the temperature of the liquid feeding device 4, the sample injection part 6, and the analysis column 8. The control device 14 is realized by a computer dedicated to the preparative liquid chromatograph or a general-purpose personal computer.

The fraction collector 12 may have any configuration as long as it can fractionate and collect a portion containing desired components in a mobile phase flowing out of the detector 10. For example, the fraction collector 12 may be configured in such a way that a channel from an outlet of the detector 10 is connected to a channel switching valve, and a mobile phase containing the desired components are guided to individual containers by switching of the channel switching valve. Further, the fraction collector 12 may be configured in such a way that a channel from the outlet of the detector 10 is connected to a movable probe, and the probe is moved so that portions of a mobile phase containing the desired components are dropped from a tip of the probe to individual containers.

The control device 14 detects peaks corresponding to desired components (to be fractionated and collected as designated by the user) from a signal waveform obtained by the detector 10, and controls the operation of the fraction collector 12 so that portions of a mobile phase corresponding to the peaks are fractionated and collected individually. In the control device 14, in order to detect peaks corresponding to desired components from the signal waveform obtained by the detector 10, thresholds for detecting start points and end points of the peaks are set.

Figure 2:
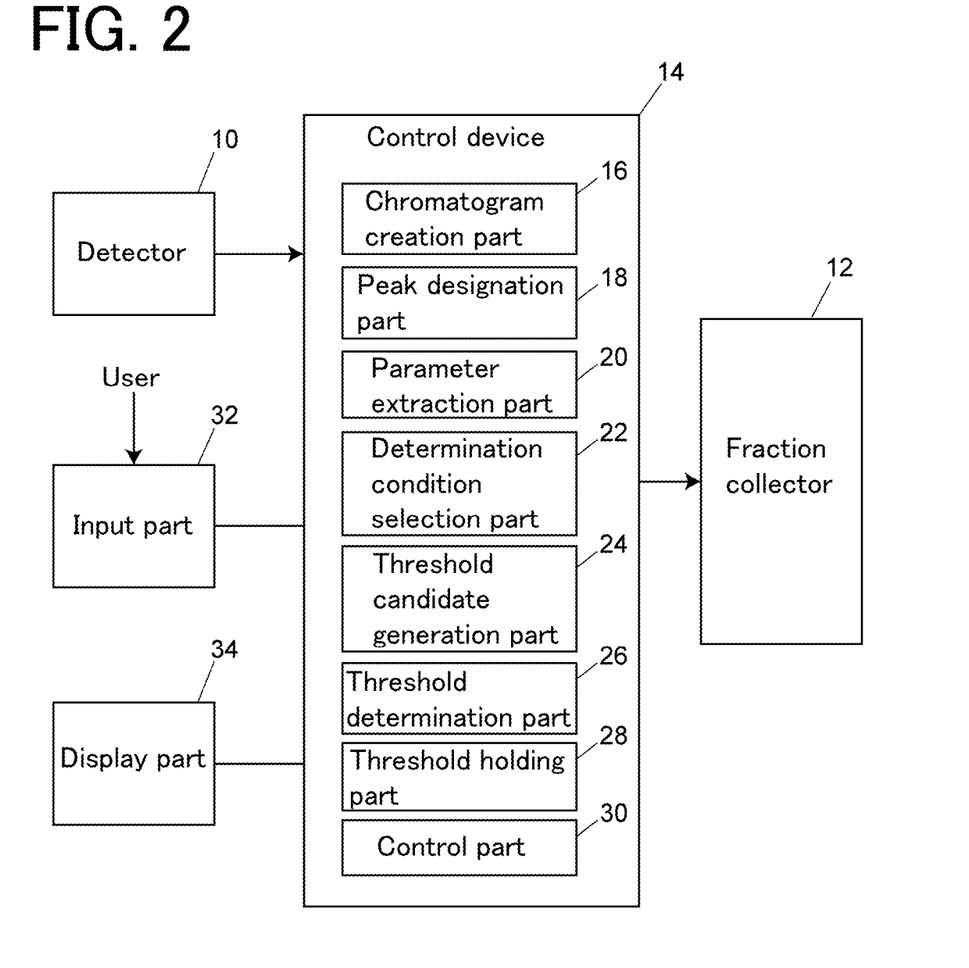
FIG. 2 is a block diagram schematically showing a configuration of a control device of the embodiment.

A threshold setting function for peak detection in the control device 14 will be described with reference to a block diagram of FIG. 2.

The control device 14 includes a chromatogram creation part 16, a peak designation part 18, a parameter extraction part 20, a determination condition selection part 22, a threshold candidate generation part 24, a threshold determination part 26, a threshold holding part 28, and a control part 30.

Further, an input part 32 and a display part 34 are connected to the control part 14. The input part 32 is realized by, for example, a keyboard, a mouse, or the like, and the user inputs information to the control part 14 through the input part 32. The display part 34 is realized by, for example, a liquid crystal display, and various types of information, such as a chromatogram created based on detection signal data obtained by the detector 10, is displayed on the display part 34.

Usually, setting of a threshold for performing peak detection is performed for each sample. Before setting a threshold, it is necessary to perform a trial analysis (hereinafter, this analysis will be referred to as "analysis for setting") on the sample and to obtain analysis data of the sample. The chromatogram creation part 16 creates a chromatogram based on the analysis data acquired as described above. Hereinafter, a chromatogram created based on the analysis data obtained by the analysis for setting will be referred to as "chromatogram for setting".

Figure 4:
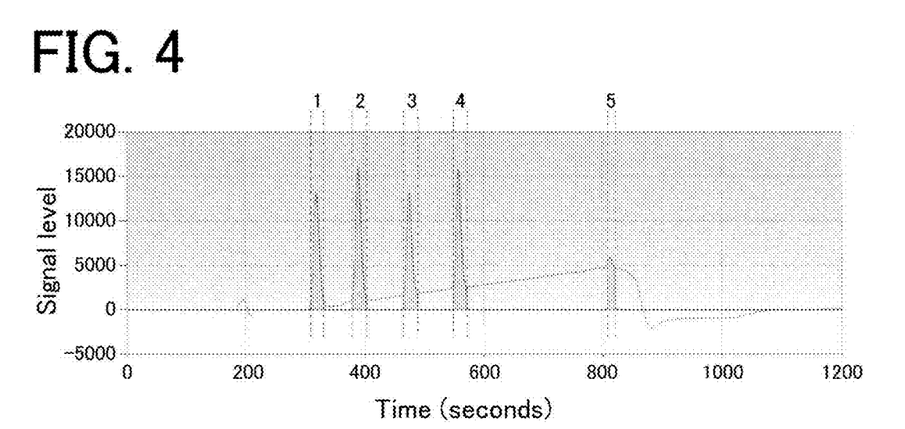
FIG. 4 is an example of a chromatogram created based on measurement data obtained by a detector.

The peak designation part 18 is configured to display the chromatogram for setting on the display part 34, and to require the user to designate peaks to be fractionated and collected on the chromatogram for setting. For example, in a case where the chromatogram for setting is as shown in FIG. 4, the user is required to set start points and end points of the peaks to be fractionated and collected, as shown by a broken line in the diagram. By this setting, Peaks 1 to 5 to be fractionated and collected are designated.

The parameter extraction part 20 extracts (calculates) parameters at the start points and the end points of the peaks designated by the user, that is, a signal level and a slope. By this extraction, a parameter table as shown in Table 1 is obtained. Note that, in Table 1, "start point" is a time (seconds) at a peak start point, "end point" is a time (seconds) at a peak end point, "start slope" is a slope at the peak start point, "start level" is a signal level at the peak start point, "end slope" is a slope at the peak end point, and "end level" is a signal level at the peak end point.

TABLE 1

| Peak Number | Start Point | End Point | Start Slope | Start Level | End Slope | End Level |
|---|---|---|---|---|---|---|
| 1 | 311 | 330 | 1714 | 270 | −1526 | 435 |
| 2 | 380 | 402 | 2153 | 1094 | −1340 | 1176 |
| 3 | 466 | 488 | 1286 | 1835 | −3180 | 1918 |

TABLE 1-continued

| Peak Number | Start Point | End Point | Start Slope | Start Level | End Slope | End Level |
|---|---|---|---|---|---|---|
| 4 | 550 | 571 | 880 | 2577 | −500 | 2494 |
| 5 | 809 | 820 | 926 | 4801 | −2673 | 4637 |

The determination condition selection part 22 is configured to select, as a determination condition, which parameters of only a signal level, only a slope, and both a signal level and a slope, are used as a parameter used for the threshold for peak detection, based on a shape of the chromatogram for setting, for example, the presence or absence of the drift of a baseline and a slope of the baseline. For example, in the chromatogram in FIG. 4, the baseline is inclined in a rising direction, and, in a case where a signal level is used as a parameter of a threshold, when a signal level that detects Peak 5 is set as a threshold, the signal level as the threshold becomes significantly higher than a signal level at a start point of Peaks 1 to 4, and detection of Peaks 1 to 4 is delayed. Therefore, in the chromatogram as shown in FIG. 4, "only a slope" is selected as the determination condition.

The threshold candidate generation part 24 is configured to generate a threshold candidate by which all peaks designated by the user can be detected based on the parameters extracted by the parameter extraction part 20 and the determination condition selected by the determination condition selection part 22.

For example, the threshold candidate generation part 24 may be configured to generate a plurality of simulation parameters based on the parameters extracted by the parameter extraction part 20, execute a simulation for peak detection in the chromatogram for setting by sequentially using the generated simulation parameters, and search for a threshold candidate by which all the peaks designated by the user can be detected. The simulation parameters generated based on the parameters extracted by the parameter extraction part 20 may be the parameters extracted by the parameter extraction part 20 themselves, or parameters obtained by processing the parameters extracted by the parameter extraction part 20.

As a method of searching for a threshold candidate, there is a method of executing simulation in order from the smallest value in each parameter extracted by the parameter extraction part 20. The "simulation" means to virtually detect of the peak start point and the peak end point by a threshold by using the chromatogram for setting as a chromatogram obtained by actual analysis.

Here, in detection of a peak in actual analysis and simulation, the start point and the end point of the peak are detected when a value of the determination condition (signal level and/or slope) of the peak is "beyond" the threshold. Being "beyond" the threshold means that, in detection of the start point of the peak, the value of the determination condition (signal level and/or slope) is equal to or greater than the threshold, and that, in detection of the end point of the peak, a value of a signal level is equal to or less than the threshold for the determination condition "signal level", and a value of a slope is equal to or greater than the threshold for the determination condition "slope".

Referring to the chromatogram in FIG. 4 as an example, the parameter for a threshold used in this chromatogram is "only a slope". Accordingly, first, "880", which is the smallest of a start slope, and "−500", which is the smallest absolute value, that is, the most gentle slope, of an end slope, are set as the simulation parameters, and these simulation parameters are used as a threshold for detecting the peak start point and a threshold for detecting the peak end point to execute simulation for peak detection in the chromatogram for setting of FIG. 4.

Whether or not a peak detected in the simulation matches a peak designated by the user is determined, and if they match, the start slope "880" and the end slope "−500" are set as threshold candidates. If the peak detected in the simulation does not match the peak designated by the user, those numerical values are excluded from threshold candidates.

Here, that the peak detected in the simulation matches the peak designated by the user means that at least the number of peaks designated by the user matches the peaks detected in the simulation. In the example of FIG. 4, in a case where although the user designates five peaks of 1 to 5, only four or less peaks are detected or six or more peaks are detected in the simulation, the peak detected in the simulation is determined not to match the peak designated by the user. In this case, the simulation parameters used for the simulation are not employed as threshold candidates.

Furthermore, the determination system for the matching degree of peaks is improved since whether or not time in which each peak appears matches each other is also used as the determination standard. The determination of the matching degree of the appearance times can be performed based on whether or not a difference in time of the peak start point and end point of both the peaks is within a preset reference range. In this manner, in a case where although the number of peaks detected in the simulation matches the number of peaks designated by the user, there is a difference in the appearance time of any peak, both the peaks are determined not to match each other, and the simulation parameters used in the simulation are not employed as threshold candidates.

The matching determination of peaks with the simulation is executed by sequentially using parameters ("slope" and/or "signal level") as the determination condition from, for example, those having smaller absolute values, so that one or a plurality of threshold candidates by which all peaks designated by the user can be detected are generated. After the simulation in which a threshold of the start slope (slope) is set to "880" and a threshold of the end slope (slope) is set to "−500" is executed, either one or both of the start slope and the end slope are changed to the next smaller simulation parameters, and the simulation is executed. For example, after the simulation in which a threshold of the start slope is set to "880" and a threshold of the end slope is set to "−500", the simulation may be executed by fixing the threshold of the start slope at "880" and changing the threshold of the end slope to "−1340".

Note that the simulation does not need to be executed for all of the parameters serving as the determination conditions. For example, the simulation is executed using parameter values from those having smaller absolute values, and when a peak not detected by simulation among peaks designated by the user appears, it is not necessary to execute simulation using a parameter value larger in terms of absolute value than the parameter value used in the simulation.

Further, in a case where the determination condition is "both a signal level and a slope", while parameter values of a signal level and a slope are changed, one or a plurality of threshold candidates by which all the peaks designated by the user can be detected are searched for and generated.

Note that, as described above, the simulation parameters used for the simulation are not limited to the parameters extracted by the parameter extraction part 20, and may be parameters obtained by processing the parameters extracted by the parameter extraction part 20. For example, the simulation parameters may be generated in such a manner that, based on the smallest value of a parameter as the determination condition among the parameter values extracted by the parameter extraction part 20, the value is increased at a constant value interval. For example, the simulation parameters for the start slope can be generated in such a manner as "880+α", "880+2α", "880+3α", . . . by using the minimum value "880" of the extracted start slope, and the simulation parameters for the end slope can be generated in such a manner as "−500−α", "−500−2α", "−500−3α", . . . .

The threshold determination part 26 presents the user with the threshold candidates generated by the threshold candidate generation part 24 by displaying them on the display part 34, and requires the user to determine a threshold. The determination of a threshold by the user may be performed in a manner that the user selects the threshold from among the threshold candidates displayed on the display part 34, or in a manner that the user adjusts a value based on the threshold candidates displayed on the display part 34.

When the threshold candidate is presented on the display part 34, a result of the simulation executed using the threshold candidate is preferably also displayed automatically or in response to a request from the user. In this manner, the user can select or adjust a threshold while watching viewing the simulation result, and the convenience of the user is improved.

The threshold determined by the user is held in the threshold holding part 28. The control part 30 is configured to detect a desired peak from the detection signal obtained by the detector 10 using the threshold held in the threshold holding part 28, and control the operation of the fraction collector 12 so that a mobile phase portion corresponding to the peak is fractionated and collected.

The chromatogram creation part 16, the peak designation part 18, the parameter extraction part 20, the determination condition selection part 22, the threshold candidate generation part 24, the threshold determination part 26, and the control part 30 are functions that are realized by an arithmetic element, such as a microcomputer, provided in the control device 14 executing a predetermined program. Further, the threshold holding part 28 is a function realized by part of a storage area of a storage device provided in the control device 14.

Figure 3:
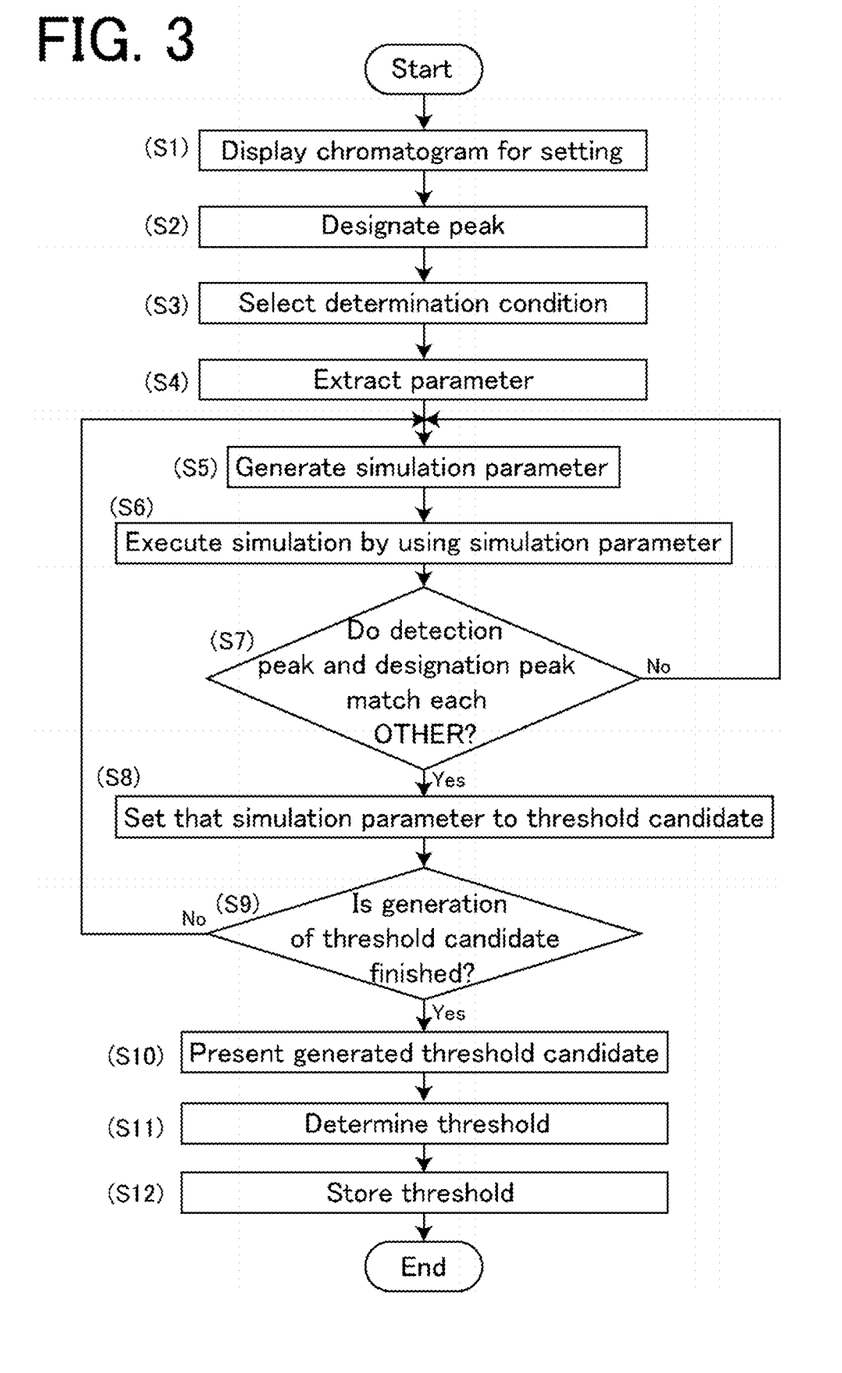
FIG. 3 is a flowchart showing operation of setting a peak detection threshold according to the embodiment.

An example of a threshold setting procedure of this embodiment will be described with reference to FIG. 2 and a flowchart of FIG. 3.

Prior to the threshold setting procedure being performed, a trial analysis (analysis for setting) is performed on a target sample to create the chromatogram for setting. When a threshold setting mode is executed, the peak designation part 18 displays the chromatogram for setting on the display part 34 (Step S1), and requires the user to designate a peak to be fractionated and collected on the chromatogram for setting (Step S2). When the user designates peaks, the determination condition selection part 22 selects a determination condition suitable for detecting all of the designated peaks based on the drift status of the chromatogram for setting and the like (Step S3). The parameter extraction part 20 extracts each parameter (signal level and/or slope) at the start point and the end point of each of the designated peaks (Step S4).

The threshold candidate generation part 24 generates the simulation parameters based on the extracted parameters of each peak (Step S5). The simulation parameter generated first is, for example, the smallest value in each parameter used for the determination condition. The threshold candidate generation part 24 executes simulation of peak detection in the chromatogram for setting using the generated simulation parameters (Step S6), and determines whether or not the peaks (detected peaks) detected in the simulation match the peaks (designated peaks) designated by the user (Step S7). If the detected peaks match the designated peaks, the parameter is set as a threshold candidate (Step S8). If not, the parameter is excluded from the threshold candidate. One or a plurality of threshold candidates are searched for and generated by executing the simulation and the operation of matching determination on a plurality of parameter values.

After the generation of the threshold candidate is finished (Step S9), the generated threshold candidate is presented to the user (Step S10). The threshold determination part 26 causes the user to determine a threshold to be used for actual analysis among the generated threshold candidates (Step S11). The determined threshold is held in the threshold holding part 28 (Step S12).

Figure 5:
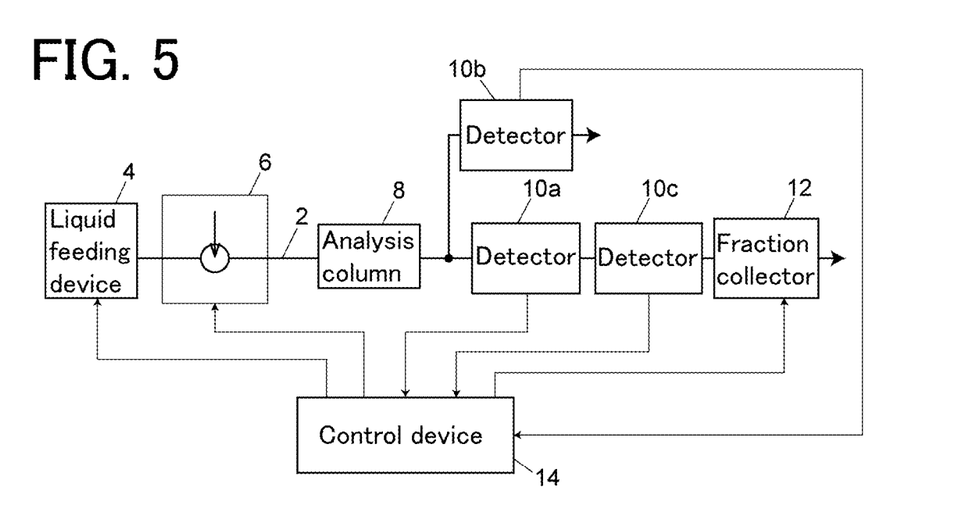
FIG. 5 is a schematic channel configuration diagram showing another embodiment of the preparative liquid chromatograph.

The embodiment described above controls the operation of the fraction collector 12 based on a signal of one of the detector 10. However, the present invention is not limited to this, and can also be applied to a preparative liquid chromatograph provided with a plurality of detectors. FIG. 5 schematically shows an example of such a preparative liquid chromatograph.

In the embodiment of FIG. 5, three detectors 10a to 10c are provided, each of which detects components flowing out of the analysis column 10. The detectors 10a to 10c have different detection methods, and the chromatograms obtained are also different. The control device 14 takes in detection signals of the detectors 10a to 10c, and controls the operation of the fraction collector 12 based on signal waveforms of those signals.

In such a preparative liquid chromatograph, since the chromatograms obtained by the detectors 10a to 10c are different, a threshold for detecting desired peaks in each chromatogram is also different. On the other hand, the method of setting the threshold may be the same as that in the case of only one detector as in the embodiment described with reference to FIG. 1.

When the threshold is set in the preparative liquid chromatograph provided with a plurality of the detectors 10a to 10c, the chromatograms for setting based on measurement data obtained by the detectors 10a to 10c created in advance are displayed. The user can designate a desired peak on any chromatogram for setting among those chromatograms for setting. The control device 14 extracts various parameters of the start point and the end of the designated peak, and executes simulation based on these parameters to generate threshold candidates capable of detecting all of the peaks designated by the user, and present them to the user. In a case where the user designates peaks on a plurality of chromatograms for setting, the number of threshold candidates presented to the user increases accordingly. The user determines a threshold for peak detection in a detection signal of each detector based on the presented threshold candidates. The control device 14 holds the threshold determined by the user and controls the operation of the fraction collector 12 using the held threshold.

DESCRIPTION OF REFERENCE SIGNS

2: Analysis channel
4: Liquid feeding device
6: Sample injection part
8: Analysis column
10, 10a, 10b, 10c: Detector
12: Fraction collector
14: Control device
16: Chromatogram creation part
18: Peak designation part
20: Parameter extraction part
22: Determination condition selection part
24: Threshold candidate generation part
26: Threshold determination part
28: Threshold holding part
30: Control part
32: Input part
34: Display part

The invention claimed is:

1. A fraction collector control device for controlling operation of a fraction collector,
the fraction collector being a device for fractionating and collecting components separated in an analysis column of a liquid chromatograph based on a signal obtained by a detector of the liquid chromatograph,
the fraction collector control device comprising:
a peak designation part configured to display a chromatogram based on analysis data of a liquid chromatograph acquired in advance as a chromatogram for setting, and to require a user to select two or more peaks in the chromatogram for setting;
a parameter extraction part configured to extract, as a parameter, a signal level and/or a slope at a start point and an end point of each peak designated by the user;
a threshold candidate generation part configured to generate, based on the parameter extracted by the parameter extraction part, at least one threshold candidate usable as a common threshold for detecting start points of all of peaks designated by the user and for detecting end points of all of the peaks designated by the user; and
a control part configured to control the fraction collector and to detect all peaks by using a single threshold determined as the common threshold based on the at least one threshold candidate generated by the threshold candidate generation part so that components of the peaks are fractionated and collected.

2. The fraction collector control device according to claim 1, further comprising a determination condition selection part configured to select to use, as the threshold, which of only a signal level, only a slope, and both a signal level and a slope, based on a shape of the chromatogram for setting.

3. The fraction collector control device according to claim 1, further comprising a threshold determination part that presents a user with threshold candidates generated by the threshold candidate generation part and requires the user to determine a threshold.

4. The fraction collector control device according to claim 1, wherein
the threshold candidate generation part is configured to generate simulation parameters based on the parameter extracted by the parameter extraction part, to execute simulation of peak detection in the chromatogram for setting using the simulation parameters, and to set, as the threshold candidate, only simulation parameters used in simulation in which only peaks designated by a user is detected.

5. The fraction collector control device according to claim 4, further comprising a threshold determination part that presents a user with a threshold candidate generated by the threshold candidate generation part and requires the user to determine a threshold, wherein the threshold determination part is configured to present, together with the threshold candidate generated by the threshold candidate generation part, a result of the simulation executed using the threshold candidate to the user.

6. The fraction collector control device according to claim 1, wherein
the liquid chromatograph includes a plurality of types of detectors, and
the threshold candidate generation part is configured to generate a threshold candidate for detecting peaks designated by the user in a chromatogram obtained in each detector.

7. A preparative liquid chromatograph comprising:
a liquid feeding device for feeding a mobile phase;
an analysis channel through which the mobile phase fed by the liquid feeding device flows;
a sample injection part for injecting a sample into the analysis channel;
an analysis column that separates a sample into components downstream of the sample injection part on the analysis channel;
a detector for detecting the components separated by the analysis column downstream of the analysis column on the analysis channel;
a fraction collector for collecting components that has passed through the detector on an outlet side of the detector; and
the fraction collector control device according to claim 1 that controls the fraction collector based on a detection signal obtained in the detector so that the components separated by the analysis column are fractionated and collected by the fraction collector.

8. A fraction collector control device for controlling operation of a fraction collector,
the fraction collector being a device for fractionating and collecting components separated in an analysis column of a liquid chromatograph based on a signal obtained by a detector of the liquid chromatograph,
the fraction collector control device comprising:
a peak designation part configured to display a chromatogram based on analysis data of a liquid chromatograph acquired in advance as a chromatogram for setting, and to require a user to select two or more peaks in the chromatogram for setting;
a parameter extraction part configured to extract, as a parameter, a signal level and/or a slope at a start point and an end point of each peak designated by the user;
a threshold candidate generation part configured to generate, based on the parameter extracted by the parameter extraction part, at least one threshold candidate usable as a common threshold for detecting start points of all of peaks designated by the user and for detecting end points of all of the peaks designated by the user; and
a control part configured to control the fraction collector and to detect all peaks by using single threshold determined as the common threshold based on the threshold candidate generated by the threshold candidate generation part so that components of the peaks are fractionated and collected, wherein
the threshold candidate generation part is configured to generate simulation parameters based on the parameter extracted by the parameter extraction part, to execute simulation of peak detection in the chromatogram for setting using the simulation parameters, and to set, as the threshold candidate, only simulation parameters used in simulation in which number of detected peaks is equal to number of the peaks designated by the user.

9. The fraction collector control device according to claim 8, wherein
the threshold candidate generation part is configured to set, as the threshold candidate, only simulation parameters used in simulation in which differences between start points of the detected peaks and start points of the peaks designated by the user are each in predetermined range and/or differences between end points of the detected peaks and end points of the peaks designated by the user are each in predetermined range.

* * * * *